United States Patent
Lee et al.

(10) Patent No.: US 8,547,349 B2
(45) Date of Patent: Oct. 1, 2013

(54) MOBILE TERMINAL AND DATA DISPLAY METHOD FOR THE SAME

(75) Inventors: Myeong Lo Lee, Seoul (KR); Jung Yeob Oh, Seongnam-si (KR); Seung Woo Shin, Seoul (KR); Kyung Hwa Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 569 days.

(21) Appl. No.: 12/564,519

(22) Filed: Sep. 22, 2009

(65) Prior Publication Data

US 2010/0073315 A1     Mar. 25, 2010

(30) Foreign Application Priority Data

Sep. 24, 2008    (KR) .................. 10-2008-0093564

(51) Int. Cl.
*G06F 3/033* (2006.01)
*G06F 3/041* (2006.01)
*G09G 5/00* (2006.01)

(52) U.S. Cl.
USPC ...................... 345/173; 345/156; 345/184

(58) Field of Classification Search
None
See application file for complete search history.

(56) References Cited

U.S. PATENT DOCUMENTS

| | | | |
|---|---|---|---|
| 6,115,025 A * | 9/2000 | Buxton et al. ................. 345/659 |
| 6,347,290 B1 * | 2/2002 | Bartlett ......................... 702/150 |
| 7,471,328 B2 * | 12/2008 | Kim et al. ................ 348/333.12 |
| 7,562,459 B2 * | 7/2009 | Fourquin et al. ............ 33/366.11 |
| 8,068,121 B2 * | 11/2011 | Williamson et al. .......... 345/659 |
| 2005/0114788 A1 * | 5/2005 | Fabritius ........................ 715/767 |
| 2006/0052109 A1 * | 3/2006 | Ashman et al. ................ 455/440 |
| 2006/0103631 A1 * | 5/2006 | Mashima et al. ............. 345/158 |
| 2007/0259685 A1 * | 11/2007 | Engblom et al. ........... 455/550.1 |
| 2010/0214216 A1 * | 8/2010 | Nasiri et al. .................. 345/158 |

* cited by examiner

*Primary Examiner* — K. Wong
(74) *Attorney, Agent, or Firm* — H.C. Park & Associates, PLC

(57) ABSTRACT

A mobile terminal and a method of displaying data for the same are disclosed. The data display method includes displaying one or more tags, checking whether a motion of the mobile terminal is detected, identifying the terminal motion if terminal motion is detected, and displaying rearranged tags when the identified terminal motion is related to tag rearrangement.

20 Claims, 7 Drawing Sheets

FIG. 4A

| Indicator |
|---|
| PHONEBOOK |
| A |
| Ab |
| Abc |
| B |
| Ba |
| Bc |
| Bd |
| MENU1 MENU2 MENU3 MENU4 |

FIG. 4B

| Indicator |
|---|
| PHONEBOOK |
| B |
| Ba |
| Bb |
| Bc |
| Bd |
| Be |
| Bf |
| MENU1 MENU2 MENU3 MENU4 |

FIG . 4C

| Indicator |
|---|
| PHONEBOOK |
| C |
| Ca |
| Cb |
| D |
| Da |
| F |
| Fa |
| MENU1 MENU2 MENU3 MENU4 |

FIG . 6

| Indicator ||
|---|---|
| PHONEBOOK ||
| A | 3 |
| B | 9 |
| C | 4 |
| D | 1 |
| H | 2 |
| I | 3 |
| J | 2 |
| MENU1 | MENU2 | MENU3 | MENU4 |

MOBILE TERMINAL AND DATA DISPLAY METHOD FOR THE SAME

CROSS REFERENCE TO RELATED APPLICATION

This application claims priority from and the benefit of Korean Patent Application No. 10-2008-0093564, filed on Sep. 24, 2008, which is hereby incorporated by reference for all purposes as if fully set forth herein.

BACKGROUND OF THE INVENTION

1. Field of the Invention

Exemplary embodiments of the present invention relate to a mobile terminal and to a method for displaying data according to motion of the mobile terminal.

2. Description of the Background

In recent years, mobile terminals have rapidly evolved into multimedia devices capable of providing various supplementary services related to text messages, cameras, MP3 players, electronic-notes, gaming, and/or schedule management. With an increasing number of supplementary services being provided by a mobile terminal, data stored in the mobile terminal is increasing in terms of category and quantity.

As mobile terminals have become more diverse in design and smaller in size, the number of mobile terminals having a touch screen is rapidly increasing. A touch screen is a device that may include an input means for receiving a signal from the user and a display means for displaying functions and data of the mobile terminal, as a single entity.

Generally, if data is displayed on a mobile terminal having a touch screen, the user can view desired data using a scroll bar or by inputting a character through a keypad. For example, when the user selects data such as a phonebook or a call log, the mobile terminal displays the selected data in the form of a list. Then, when the user drags the scroll bar or inputs a keyword through the keypad to find a desired item in the list, the mobile terminal highlights the item selected by dragging the scroll-bar or keyword input through the keypad. The mobile terminal may display not only the selected data item, but also other data items neighboring the selected data item.

However, the above-mentioned data display scheme has a disadvantage in that the user may have to spend a long period of time to search for a desired data item in proportion to the amount of data stored in the mobile terminal. In addition, the user may be inconvenienced by having to check items of a list displayed on the mobile terminal, one at a time, to find the desired data item.

SUMMARY OF THE INVENTION

Exemplary embodiments of the present invention provide a mobile terminal and a method of displaying data for the same.

Exemplary embodiments of the present invention also provide a mobile terminal and a method of displaying data according to detected input events and variations in motion of the mobile terminal.

Additional features of the invention will be set forth in the description which follows, and in part will be apparent from the description, or may be learned by practice of the invention.

Exemplary embodiments of the present invention disclose a data display method for a mobile terminal, including: displaying one or more tags, and checking whether a motion of the mobile terminal is detected; identifying, when a motion is detected, the motion; and rearranging, when the identified motion is related to tag rearrangement, the tags, and displaying the rearranged tags.

Exemplary embodiments of the present invention disclose a mobile terminal including: a display unit displaying tags and data associated with the tags; a motion sensing unit detecting a motion of the mobile terminal for tag rearrangement; a storage unit storing tags and data associated with the tags, and storing event information and motion information; and a control unit controlling the display unit to display one or more tags, comparing, when a motion of the mobile terminal is detected through the motion sensing unit, the detected motion with the motion information stored in the storage unit, and rearranging, when the detected motion is related to tag rearrangement, the tags and controlling the display unit to display the rearranged tags.

In a feature of the present invention, a mobile terminal can classify and display a large amount of data according to predetermined input events or motion variations. In addition, the mobile terminal can display data in order of tag creation dates or tag priorities according to input events or motion variations, enabling the user to quickly access a desired data item.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4A, FIG. 4B, and FIG. 4C illustrate screen representations in which tags are rearranged according to input events according to exemplary embodiments of the present invention.

FIG. 6 illustrates a screen representation in which tags are rearranged according to the motion of the mobile terminal according to exemplary embodiments of the present invention.

DETAILED DESCRIPTION OF ILLUSTRATED EMBODIMENTS

Figure 1:
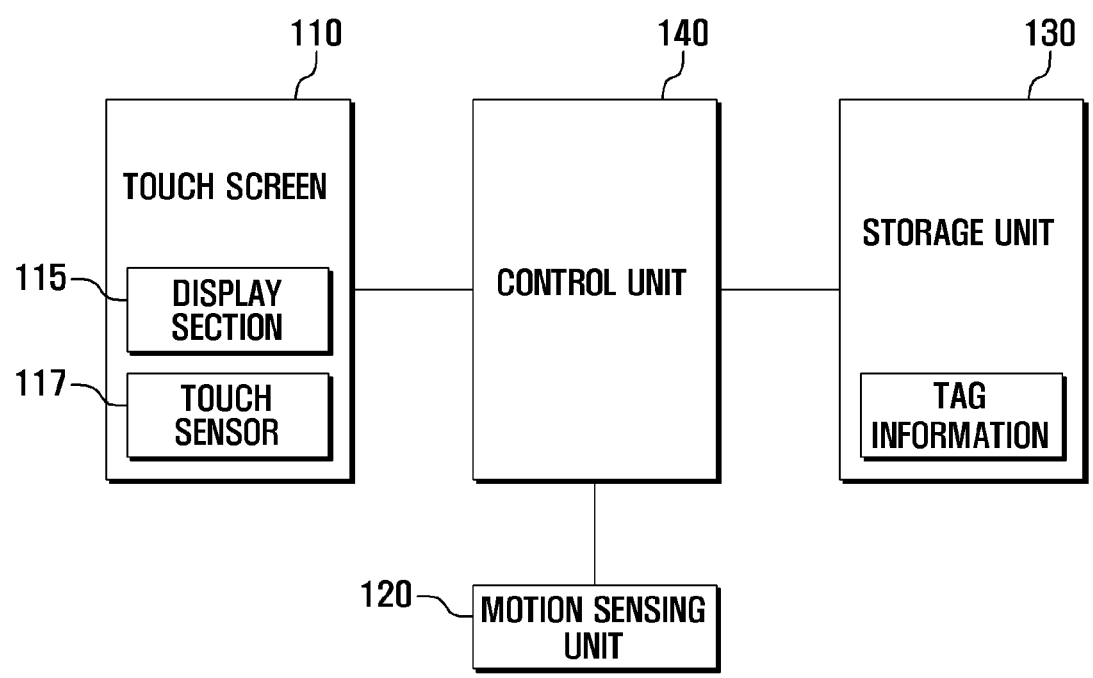
FIG. 1 is a block diagram illustrating a mobile terminal according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Prior to explaining exemplary embodiments of the present invention, relevant terminology will be defined for the description below.

'Data' may refer to all data stored in a mobile terminal. Hence, 'data' may include data downloaded from other mobile terminals or the Internet, data created by the user, and/or data generated during operation of the mobile terminal. Examples of data may include phone numbers, images (e.g., a photo, a moving image or a picture), call logs, and MP3 files.

'Tag' may refer to detailed information describing a piece of data stored in a mobile terminal. Tags may include information regarding data such as data name, data size, creation date and time, data type, icon, and thumbnail. Tag information may be utilized when data is displayed. For example, when the user selects a data display mode, the mobile terminal may display data in order of data names, data sizes, or data creation times, which are tags. In addition, when the user selects the data display mode, the mobile terminal may display tags first instead of stored data. Then, when the user selects one of the tags, the mobile terminal may display data associated with the selected tag.

'Data display mode' may refer to operation modes in which data stored in the mobile terminal may be displayed. For example, the data display mode may include a phonebook mode for displaying phone numbers stored in the mobile terminal, a message-viewing mode for displaying received and transmitted text messages, an image-viewing mode for displaying stored photographs, moving images or pictures, a file-viewing mode for listing stored files, and a call-log viewing mode for listing calls placed and received. In the data display mode, tags associated with data may be displayed first, and a data item associated with the tag selected by the user may be displayed next.

'Input event' may refer to an event generated by a contact and release by a finger or an instrument on a touch screen. The instrument may be, for example, a stylus. An input event detected by the touch screen may correspond to a tap event, a flick event, a double-flick event, or a drag event. A tap event may refer to a contact of a determined time duration and release. A flick event may refer to a contact moving in one direction for a determined time duration and release. A double-flick event may refer to at least two flick events detected within a determined time duration. A drag event may refer to a contact moving in one direction for a time duration longer than that of the flick event and release.

Hereinafter, exemplary embodiments of the present invention are described in detail with reference to the accompanying drawings.

FIG. 1 is a block diagram illustrating a mobile terminal according to exemplary embodiments of the present invention.

Referring to FIG. 1, the mobile terminal may include a touch screen 110, a motion sensing unit 120, a storage unit 130, and a control unit 140.

The touch screen 110 may include a display section 115 and a touch sensor 117. The display section 115 may display, under the control of the control unit 140, a variety of information related to states and operations of the mobile terminal. For example, during the data display mode, the display section 115 may display a variety of tag information related to the displayed data. The display section 115 may also display tags classified according to input events or motions of the mobile terminal. The display section 115 may display data items corresponding to a tag selected by the user. Tags displayed on the display section 115 may be arranged in order of creation date (newest first) or in alphabetical order according to data types.

The touch sensor 117 may be mounted on the display section 115, and may detect an input event generated by a contact and release between a user's finger or, in general any suitable input instrument, and the display section 115. The touch sensor 117 may detect an input event by identifying coordinates of areas at which a contact and corresponding release are made on the display section 115. The touch sensor 117 can make a distinction between a flick event and a drag event as follows. For example, the touch sensor 117 may determine whether a contact is made on the touch screen 110. When a contact is made on the touch screen 110, the touch sensor 117 may detect a coordinate change of the contact due to movement in one direction and a pressure change caused by the contact. The touch sensor 117 may transmit the detected pressure change and coordinate change to the control unit 140. The control unit 140 may regard the contact as a flick event if the pressure becomes lower in the moving direction, and may regard the contact as a drag event if a movement direction is indicated while the pressure is constant. In general, any suitable method may be used by the touch sensor 117 to detect input events, and various suitable event detecting schemes may be employed depending on the type of the touch sensor 117.

The motion sensing unit 120 may detect a change in motion of the mobile terminal, and may transmit information regarding the detected change to the control unit 140. For example, when the user shakes the mobile terminal or makes an O-shaped or X-shape gesture with the mobile terminal, the motion sensing unit 120 may determine the motion of the mobile terminal by sensing the rotary motion of the mobile terminal and the orientation thereof with respect to gravity. The motion sensing unit 120 may include a sensor such as a gyroscope, a vibration sensor, or an acceleration sensor to sense the motion of the mobile terminal. For example, if the motion sensing unit 120 includes an acceleration sensor, the motion sensing unit 120 may detect a variation in gravitational acceleration caused by the motion of the mobile terminal, and may determine, based on the detected variation in gravitational acceleration, whether the mobile terminal is being shaken or is making a specific gesture.

The storage unit 130 may store a variety of programs for controlling general operations of the mobile terminal and may store various data generated during execution of the mobile terminal operations. The storage unit 130 may also further store tag information assigned to each data set. The tag information may include detailed information regarding data such as data names, creation times (year, month and date), and data types. The storage unit 130 may store event information and motion information to rearrange tags. The control unit 140 may compare an input event detected through the touch screen 110 with the event information stored in the storage unit 130, and may compare a motion detected through the motion sensing unit 120 with the motion information stored in the storage unit 130.

The control unit 140 may control overall states and operations of the mobile terminal. When a data display mode is selected by the user, the control unit 140 may control the display section 115 to display tags corresponding to the selected data display mode. The control unit 140 may rearrange the tags according to an input event detected through the touch screen 110. For example, the control unit 140 may compare an input event detected through the touch screen 110 with the event information stored in the storage unit 130. When the detected input event matches an item that is set for tag rearrangement in the event information, the control unit 140 may change the arrangement order of the tags displayed on the display section 115 and redisplay the tags in a rearranged order.

In addition, the control unit 140 may group data items according to tag contents in response to a terminal motion detected through the motion sensing unit 120. The control unit 140 may display tags corresponding to the grouped data items on the display section 115. The control unit 140 may control the display section 115 to display tags and the number of data items grouped together under each tag. If a terminal motion detected by the motion sensing unit 120 indicates tag rearrangement, the control unit 140 may check tags for a data set. The control unit 140 may group data items of the data set by using the tag contents. For example, using the tags, the control unit 140 may group data items by date or in alphabetical order of data names. Then, the control unit 140 may instruct the display section 115 to display tags and the number of data items grouped under each tag.

The mobile terminal may further include one or more of a communication unit for communicating with a base station, a camera unit for photographing images, a digital multimedia broadcasting (DMB) receiver for receiving digital broadcasting signals, and an Internet access unit for accessing the Internet.

Next, a method of displaying data according to input events and terminal motions is described with reference to FIG. 2, FIG. 3, FIG. 4A, FIG. 4B, FIG. 4C, FIG. 5, and FIG. 6.

Figure 2:
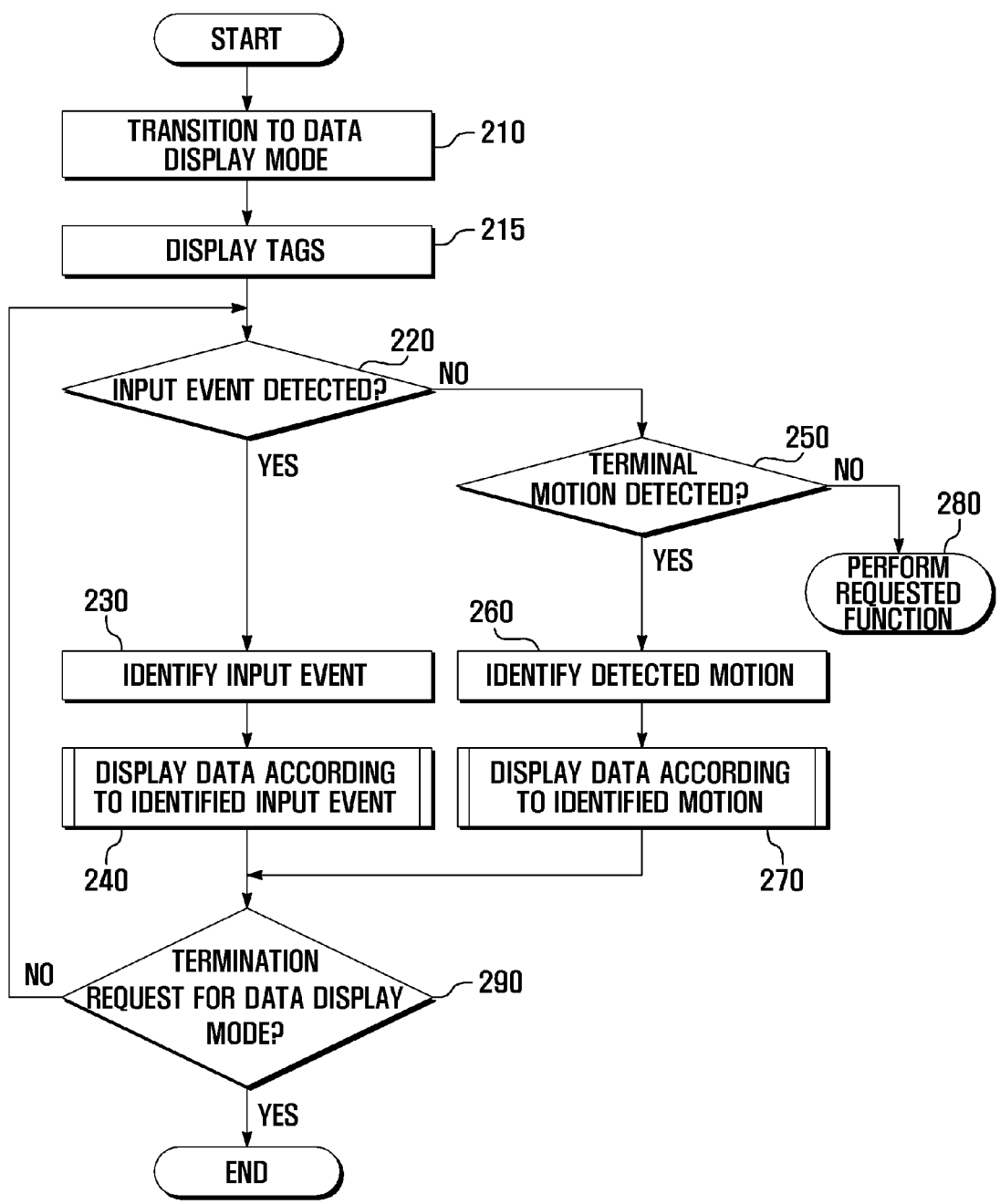
FIG. 2 is a flowchart illustrating a method of displaying data according to exemplary embodiments of the present invention.
Figure 3:
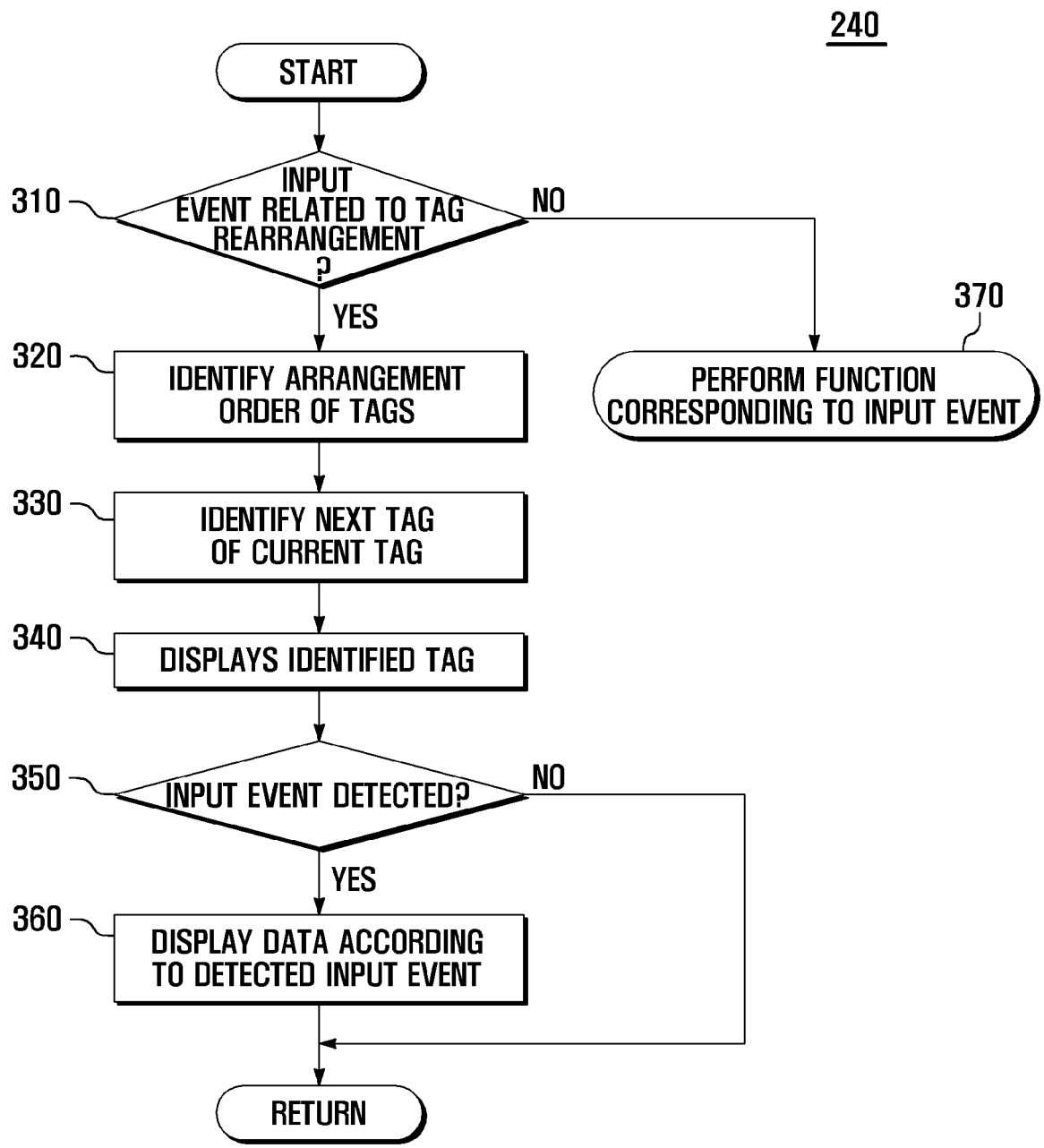
FIG. 3 is a flowchart illustrating a procedure for displaying data according to an input event in the method of FIG. 2 according to exemplary embodiments of the present invention.
Figure 5:
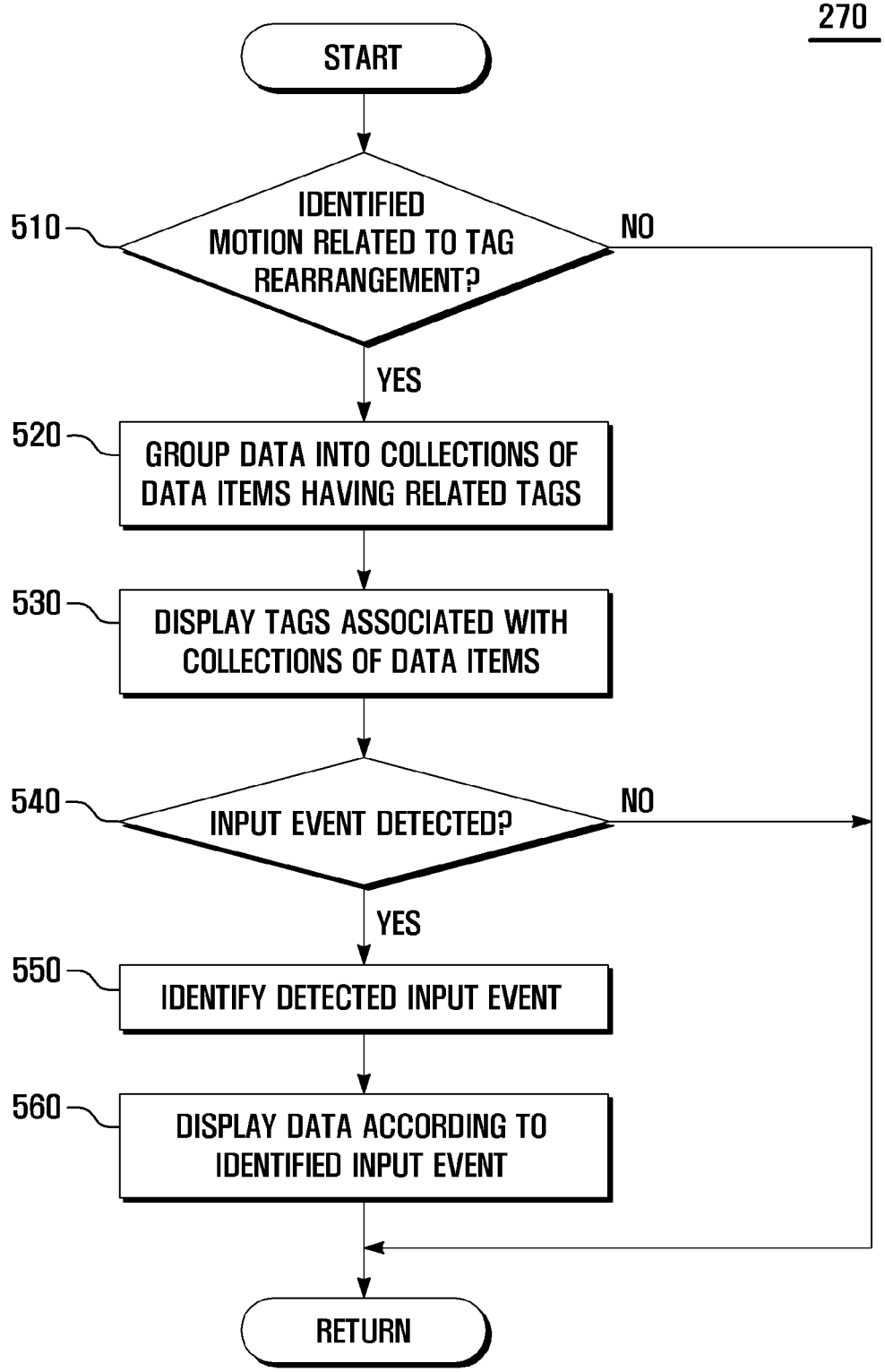
FIG. 5 is a flowchart illustrating a procedure for displaying data according to motions of the mobile terminal in the method of FIG. 2 according to exemplary embodiments of the present invention.

FIG. 2 is a flowchart illustrating a method for displaying data according to exemplary embodiments of the present invention. FIG. 3 is a flowchart illustrating a procedure for displaying data according to an input event. FIG. 4A, FIG. 4B, and FIG. 4C illustrate screen representations in which tags are rearranged according to input events. FIG. 5 is a flowchart illustrating a procedure for displaying data according to motions of the mobile terminal. FIG. 6 illustrates a screen representation in which tags are rearranged according to a motion of the mobile terminal.

Referring to FIG. 2, when the user selects a data display mode through a menu, a function key, or a soft key displayed on the touch screen 110, the control unit 140 may transition to the data display mode (210). The control unit 140 may display tags corresponding to the data display mode on the display section 115 of the touch screen 110 (215). For example, if the user selects a phonebook through a menu or the like, the control unit 140 may display tags associated with the selected phonebook on the display section 115. The tags may include user names assigned to phone numbers of the phonebook. The user names may be listed as tags on the display section 115 in alphabetical order. Tags may be arranged in various arrangements. For example, tags may be arranged in order of date, data size, data types, or settings specified by the user or manufacturer.

The control unit 140 may determine whether an input event is detected through the touch screen 110 (220). If an input event is detected, the control unit 140 may identify the detected input event (230), and may display data according to the identified input event (240). Step 240 for data display according to an input event is described in connection with FIG. 3, FIG. 4A, FIG. 4B, and FIG. 4C.

Referring to FIG. 3, the control unit 140, which has identified the input event detected through the touch screen 110, may determine whether the input event is related to tag rearrangement (310). For example, if a double-flick event is pre-specified for tag rearrangement, the control unit 140 may determine whether the input event is a double-flick event.

If the input event is a double-flick event (related to tag rearrangement), the control unit 140 may identify the arrangement order of the tags being displayed on the display section 115 (320). For example, the control unit 140 may check whether the tags displayed on the display section 115 are arranged in alphabetical order, creation date, or newest first. In the description hereinafter, it is assumed that tags are arranged in alphabetical order.

After identification of the tag arrangement order, the control unit 140 may identify the next tag of the current tag (first tag) being displayed on the display section 115 (330). The control unit 140 displays the identified tag on the display section 115 (340). Steps 320 to 340 are further described with reference to FIG. 4A, FIG. 4B, and FIG. 4C.

For example, if the data display mode is related to phonebook display, the control unit 140 may display user names composed of at least one letter as tags on the display section 115, as shown in FIG. 4A. If the input event detected through the touch screen 110 is a double-flick event, the control unit 140 may check the arrangement order of the tags displayed on the display section 115, and may determine that the tags are arranged in an alphabetical order. The control unit 140 may identify a tag 'B' as the tag subsequent to the tag 'A,' being the first tag on the display section 115. The control unit 140 may then erase the first tag 'A' and other tags subordinate to the tag 'A' (e.g., 'Ab' and 'Abc'), and may display the next tag 'B' and other tags subordinate to the tag 'B' (e.g., 'Ba', 'Bb', 'Bc' and 'Bd') together, as shown in FIG. 4B.

After tag display, the control unit 140 may determine whether an input event is detected through the touch screen 110 (350). If no input event is detected, the method to display data according to an identified input may return to step S290, as shall be described in more detail below. If an input event is detected, the control unit 140 performs data display according to the detected input event (360). For example, if the detected input event is a tap event, the control unit 140 may display a data item associated with the tag mapped to the tapped area. That is, the control unit 140 may identify the tapped area and the tag mapped to the tapped area, and may display a data item associated with the identified tag on the display section 115. If a tag 'A' is mapped to an area in which the tap event is detected, the control unit 140 may retrieve data (including a user name, phone number, E-mail address and office phone number) corresponding to the tag 'A' from the storage unit 130, and may display the retrieved data on the display section 115.

Although not shown, if the detected input event is determined to be a double-flick event pre-specified for tag rearrangement, the control unit 140 may repeat steps 320 to 340. Thereby, as shown in FIG. 4C, the control unit 140 may display a tag 'C' (the next tag of the tag 'B') and other tags subordinate to the tag 'C.'

The screen of FIG. 4C lists in sequence a tag 'C' and other tags 'Ca' and 'Cb' subordinate to the tag 'C'; a tag 'D' (the tag subsequent to the tag 'C') and another tag 'Da' subordinate to the tag 'D'; and a tag 'F' (the tag subsequent to the tag 'D') and another tag 'Fa' subordinate to the tag 'F'. The tag rearrangement scheme may display many tags as long as the size of the display section 115 permits as in the case of FIG. 4C, or may display only a tag required in sequence and other tags subordinate to the required tag irrespective of the size of the display section 115.

After event-based data display (i.e., step 240), the control unit 140 may return to step 290 of FIG. 2. At step 290, the control unit 140 may check whether a termination request for the data display mode is issued. If a termination request for the data display mode is not issued, the control unit 140 may repeat step 220 and subsequent steps.

When the input event is not related to tag rearrangement at step 310, the control unit 140 may perform a function requested by the input event (370). For example, if the input event is a drag event, the control unit 140 may shift the displayed tags in sequence from bottom to top according to the dragging speed. If the input event is a tap event, the control unit 140 may identify the tag or menu item mapped to the tapped area, and may carry out the function associated with the identified tag (e.g., data display) or select the identified menu item (e.g., menu navigation).

Referring back to FIG. 2, if no input event is detected through the touch screen 110 at step 220, the control unit 140 may determine whether a terminal motion is detected through the motion sensing unit 120 (250). If a terminal motion is not detected, the control unit 140 may perform the requested function (280). If a terminal motion is detected, the control unit 140 may identify the detected terminal motion (260), and may display the data according to the identified terminal motion (270). Step 270 is described with reference to FIG. 5 and FIG. 6.

Referring to FIG. 5, after identification of a detected terminal motion, the control unit 140 may determine whether the terminal motion is related to tag rearrangement (510).

If the terminal motion is not related to tag rearrangement, the control unit 140 may return to step 290. If the terminal motion is related to tag rearrangement, the control unit 140 may group the data into collections of data items having related tags (520). The control unit 140 may then display the tags associated with the collections of data items on the display section 115 (530). The control unit 140 may instruct the display section 115 to further display the number of data items under each related tag. Steps 510 to 530 may be further described with reference to FIG. 4A and FIG. 6.

As shown in FIG. 4A, during a phonebook display mode, the control unit 140 may display user names as tags in alphabetical order on the display section 115. In some cases, as described in this example, a 'shaking' motion may indicate a terminal motion specified for tag rearrangement. After displaying the user names, the control unit 140 may check whether a terminal motion is detected through the motion sensing unit 120. If a terminal motion is detected, the control unit 140 may determine whether the detected terminal motion is the shaking motion specified for tag rearrangement. If the detected terminal motion is the shaking motion, the control unit 140 may group data items by letter in user names acting as tags. For example, as can be seen from FIG. 4A, tags 'Ab' and 'Abc' are subsumed in a tag 'A'. After the grouping, the control unit 140 can count the number of data items associated with the related tags 'A', 'Ab' and 'Abc', and may recognize the number of grouped data items as three.

Thereafter, as shown in FIG. 6, the control unit 140 may display representative tags subsuming related tags and the number of data items under each representative tag on the display section 115. For example, in response to a motion of the mobile terminal, the control unit 140 may display three as the number of data items having the tag 'A', nine as the number of data items having the tag 'B', and others on the display section 115, as shown in FIG. 6.

After motion-based tag display (step 530), the control unit 140 may check whether an input event is detected (540). If no input event is detected, the control unit 140 may return to step 290. If an input event is detected, the control unit 140 may identify the detected input event (550), and may perform data display according to the identified input event on the display section 115 (560). For example, if the input event is a drag event, the control unit 140 may shift the displayed tags in sequence from bottom to top according to the dragging speed. If the input event is a tap event, the control unit 140 may carry out a function mapped to the tapped area such as tag display or menu selection. Although not shown, if the input event is a double-flick event, the control unit 140 may perform step 240 of FIG. 2.

After data display (step 270), the control unit 140 may return to step 290 of FIG. 2. At step 290, the control unit 140 may check whether a termination request for the data display mode is issued. If a termination request for the data display mode is not issued, the control unit 140 may repeat step 220 and subsequent steps.

According to exemplary embodiments of the present invention, the input event and terminal motion for tag rearrangement may be specified by the user or manufacturer. For example, if the user selects an event and motion setting mode, the control unit 140 may regard a new input event detected through the touch screen 110 as the event for tag rearrangement and may store information on the event in the storage unit 130. In addition, the control unit 140 may regard a new terminal motion detected through the motion sensing unit 120 as the terminal motion for tag rearrangement and may store information on the terminal motion in the storage unit 130.

Although the data display mode has been described above using a phonebook as an example, the data display mode may also be applied to other modes, including, for example, a mode for displaying photographs or images. For example, when an input event detected through the touch screen 110 is related to tag rearrangement, the control unit 140 may display tags in order of creation date with, for example, the latest created display tag being displayed first. When a terminal motion detected through the motion sensing unit 120 is related to tag rearrangement, the control unit 140 may group images by creation date and display the grouped images on the display section 115. When another terminal motion detected through the motion sensing unit 120 is related to tag rearrangement, the control unit 140 may group images by creation month and may display the grouped images on the display section 115.

Although tag rearrangement is described in connection with an input event detected through the touch screen 110 and with a terminal motion detected through the motion sensing unit 120, tag rearrangement may also be applied to mobile terminals without a touch screen and motion sensing unit. For example, when a mobile terminal employing a keypad includes a function key for tag rearrangement, the mobile terminal may perform tag rearrangement as described above in response to an input of the function key from the user. A mobile terminal need not necessarily have a particular function key to perform tag rearrangement.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A data display method for a mobile terminal, comprising:
    displaying a plurality of tags;
    determining whether a motion of the mobile terminal is detected;
    identifying the motion if the motion is detected;

grouping, if the identified motion is associated with tag rearrangement, data items associated with the plurality of tags based on the identified motion;

rearranging, based on grouping the plurality of data items, the plurality of tags; and causing, at least in part, the rearranged tags to be displayed, wherein each of the plurality of tags is caused, at least in part, to be displayed in association with a number corresponding to a number of grouped data items associated with the corresponding tag, and wherein each of the plurality of tags correspond to information describing an aspect of the data items grouped in association with the corresponding tag.

2. The data display method of claim 1, wherein grouping data items comprises:

identifying data items having related tags; and grouping the data items having related tags.

3. The data display method of claim 1, wherein a motion of the mobile terminal is detected based on information receiving from one of a gyroscope, a vibration sensor, and an acceleration sensor.

4. The data display method of claim 1, wherein the tags are arranged and caused, at least in part, to be displayed based on alphabetical order, creation date, or data size.

5. A mobile terminal, comprising:

a display unit configured to display tags and data associated with the tags;

a motion sensing unit configured to detect a motion of the mobile terminal associated with rearrangement of the tags;

a storage unit configured to store the tags, the data associated with the tags, event information, and motion information; and a control unit configured to:

control the display unit to display at least one tag, compare, if a motion of the mobile terminal is detected via the motion sensing unit, the detected motion with the motion information stored in the storage unit, group data items associated with the tags based on motion information associated with the motion;

rearrange the tags based on the grouped data items if the detected motion is associated with tag rearrangement, and control the display unit to display the rearranged tags, wherein each corresponding tag is controlled to be displayed in association with a number corresponding to a number of grouped data items associated with the corresponding tag, and wherein each corresponding tag corresponds to information describing an aspect of the grouped data items associated with the corresponding tag.

6. The method of claim 1, further comprising:

receiving a user-defined motion; and causing, at least in part, the user-defined motion to be stored in association with rearrangement of the plurality tags, wherein the identified motion corresponds to the stored user-defined motion.

7. The mobile terminal of claim 5, wherein the control unit is further configured to group all data items associated with the tags stored in the storage unit.

8. The mobile terminal of claim 5, wherein the motion sensing unit comprises one of a gyroscope, a vibration sensor, and an acceleration sensor.

9. The mobile terminal of claim 5, wherein the control unit is further configured to cause the tags to be arranged and displayed based on an alphabetical order, creation date, or data size.

10. A data display method for a mobile terminal, comprising:

causing, at least in part, a plurality of tags to be displayed according to a first arrangement scheme;

causing, at least in part, a movement of the mobile terminal to be detected; and causing, at least in part, the plurality of tags to be displayed according to a second arrangement scheme if the movement is associated with tag rearrangement, wherein the second arrangement scheme differs from the first arrangement scheme, and wherein the first arrangement scheme and the second arrangement scheme are one of an alphabetical order scheme, creation date scheme, or a data size scheme, and wherein each of the plurality of tags correspond to information describing an aspect of data items arranged in association with the corresponding tag.

11. The mobile terminal of claim 5, wherein the control unit is further configured to:

receive a user-defined motion detected via the motion sensing unit; and cause the user-defined motion to be stored in association with rearrangement of the tags, wherein the detected motion corresponds to the stored user-defined motion.

12. The method of claim 10, further comprising:

comparing the detected movement with stored movement information; and determining, based on comparing the detected movement with the stored movement information, if the detected movement is associated with tag rearrangement.

13. A method for displaying data in a mobile terminal, comprising:

causing, at least in part, at least one tag to be displayed in a first arrangement according to a first arrangement scheme, each of the at least one tags corresponding to information describing an aspect of data grouped in association with the corresponding tag;

determining if an input event to a touch-based input interface associated with the mobile terminal is detected;

causing, at least in part, the at least one tag to be displayed in a second arrangement different from the first arrangement if the input event is detected, the second arrangement being associated with the detected input event;

determining, if no input event is detected, if a motion of the mobile terminal is detected; and causing, at least in part, the at least one tag to be displayed in a third arrangement according to a second arrangement scheme different from the first arrangement scheme if the motion is detected, the second arrangement scheme being associated with the detected motion.

14. The method of claim 13, wherein determining if an input event to the touch-based input interface is detected comprises:

determining if a tap event, a flick event, a double-flick event, or a drag event to the touch-based input interface is detected.

15. The method of claim 13, wherein determining if a motion of the mobile terminal is detected comprises:

determining if the mobile terminal is shaken by a user of the mobile terminal.

16. The method of claim 13, wherein determining if a motion of the mobile terminal is detected comprises:

determining if the mobile terminal is moved in a circular or cross-shaped gesture.

17. The method of claim 13, wherein the second arrangement is according to a third arrangement scheme, and wherein causing, at least in part, the at least one tag to be displayed according to a second arrangement scheme or a third arrangement scheme comprises:
causing, at least in part, the at least one tag to be displayed in at least one of an alphabetical order, an order based on creation date, and an order based on data size.

18. The method of claim 13, wherein causing, at least in part, the at least one tag to be displayed in the third arrangement comprises:
causing, at least in part, the at least one tag and a number of data items associated with the at least one tag to be displayed.

19. The method of claim 13, further comprising:
comparing the detected input event with stored event information.

20. The method of claim 13, further comprising:
receiving a user-defined motion; and
causing, at least in part, the user-defined motion to be stored in association with rearrangement of the tags,
wherein the determined motion corresponds to the stored user-defined motion.

* * * * *